Dec. 14, 1965 M. MILES 3,223,804
LOW POWER THERMOSTATIC CONTROL HAVING INDEPENDENT LOAD SOURCE
Filed Sept. 22, 1961
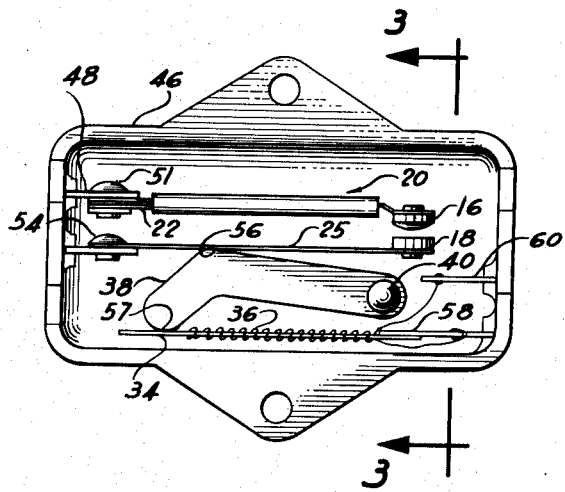
FIG. 2.
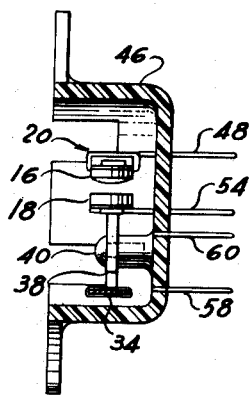
FIG. 3.
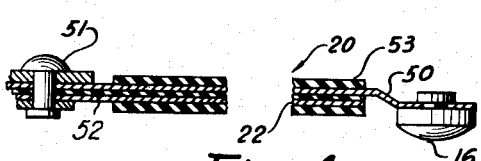
FIG. 4.
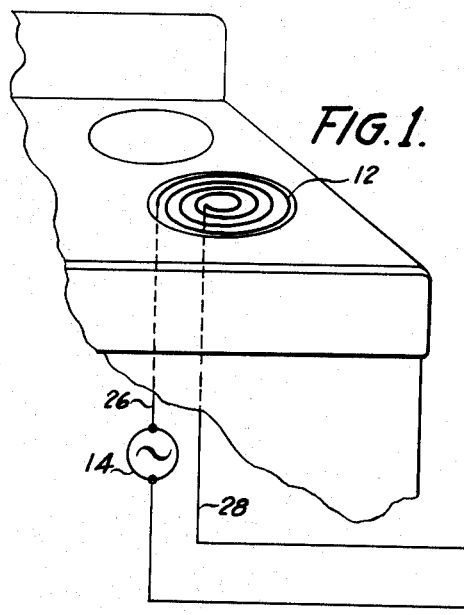
FIG. 1.
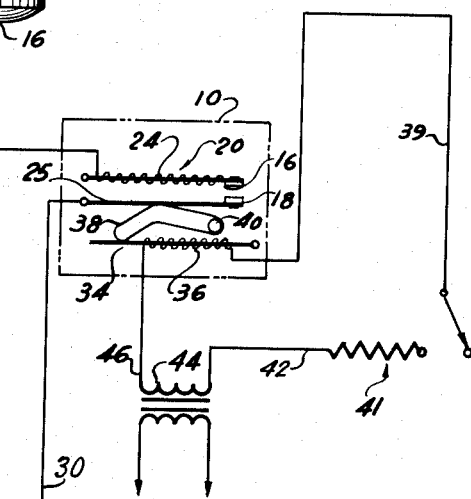
INVENTOR
Marshall Miles
By *William J. Newman*
Attorney

United States Patent Office 3,223,804
Patented Dec. 14, 1965

3,223,804
LOW POWER THERMOSTATIC CONTROL HAVING INDEPENDENT LOAD SOURCE
Marshall Miles, Skokie, Ill., assignor to Stewart-Warner Corporation, Chicago, Ill., a corporation of Virginia
Filed Sept. 22, 1961, Ser. No. 140,066
3 Claims. (Cl. 200—122)

This invention relates to electric power controls and more specifically to remotely controllable devices for adjusting the average power delivered to a load from a power source. This invention is particularly useful in electric stoves for controlling the heat output of the range heating elements, and the following disclosure is directed towards such an environment. However, it is to be understood that there may be other equally satisfactory applications of the teachings of this invention.

Present day trends in the furnishing of home kitchens tend toward the custom installation of ovens and ranges. Complete stove units including the oven, range and control units in a compact unit are becoming less prevalent in the home. The custom installation of the units dictates that the controls for the heating elements be flexibly connectable thereto to enable their positioning in any desired location. For example, while some customers may desire that the controls be located immediately adjacent the heating range elements, others may desire the controls to be in the exhaust fan hood or possibly in a kitchen wall somewhat removed from the stove units. The requirement for flexibility has caused perplexing problems to stove unit manufacturers furnishing the home market.

There are at least three methods for controlling the heat output of the heating elements in present day commercial electric stoves. For example, some manufacturers utilize multi-coil heating elements with push-button controls to vary their connections to 220 and 110 volt line sources. Other manufacturers utilize single coil elements and the average electric power delivered thereto is controlled by periodically interrupting the current flow. Manual controls, mechanically linked to thermostat switches, are used for controlling the on-off time of the heating elements. Still another method utilizes rheostat means in the heating current circuit for controllably selecting the power delivered to the heating elements.

The requirement for flexibility of control position poses specific problems for each of the above outlined methods. For example, in the multi-coil push-button type there is required a great number of heavy current carrying leads which must pass from the control unit to the power source and the heating elements. This requires heavy conduit cable which is expensive to install and must meet rigid standards of community electrical wiring codes. In the average delivered power method, mechanical linkages must be adapted for each custom installation or the thermostat switch must be positioned at the control location with heavy conduit again required between the control to the power source and heating elements. The rheostat method also requires heavy conduit from the control location to the power source and the heating elements.

It is an object of this invention to provide a device for controlling electricity in a circuit from a remote location. More particularly it is an object of this invention to control the average power delivered to a load such as an oven range from a power source by means of a device which itself is controllable by a low power controllable electric source.

It is another object of this invention to provide an inexpensive and efficient device for controlling the average power delivered to a load by means of a remote variable current source.

It is another object of this invention to provide a device which is especially useful to control the heat output of cooking stove heating elements from a control location removed from the heating element location.

A still further object of this invention is to provide a device for controlling the heat output of cooking stove heating elements which enables custom installation of the control unit selector at any desirable location with respect to the cooking stove units.

Other objects and advantages of this invention will become apparent upon a further reading of this specification, especially when taken in view of the accompanying drawings, in which:

FIG. 1 is a schematic representation of a stove range heat control circuit embodying the teachings of this invention;

FIG. 2 is an elevation view of the control unit utilized in the circuit of FIG. 1;

FIG. 3 is a section view of the control unit taken along the line 3—3 of FIG. 2; and FIG. 4 is an enlarged section view of one of the flexible arms in the control unit.

Briefly the invention resides in a device comprising a pair of contacts series connected between a power source and a load, such as the heating elements of a stove range, with means including flexible arms supporting each of the contacts in an initial non-engaging position. Means including a bimetal strip which is heatable from a controllable current source is provided for bending one of the flexible arms to initiate engagement of the contacts and control the contact pressure therebetween. The other flexible arm has a bimetal strip associated therewith which is heated responsive to the heating element power source current to cause intermittent disengaging of the contacts.

In FIG. 1 is shown a remotely controllable device 10 as it would be used to control the heat output of the stove range heating element 12. Although not shown, the control unit 10 may be positioned in convenient proximity to the heating element 12 and a power source 14 so as to maintain the high current carrying lines to a minimum length.

Within the control device 10 are a pair of contacts 16 and 18 which are engageable to complete a series circuit for energizing the heater element 12 as hereinafter described. The contact 16 is carried on a flexible supporting arm 20, the detailed construction of which will be hereinafter described. Briefly, however, it comprises a bimetal strip 22 (FIG. 4) which is heatable by a current carrying heating means 24 series connected in the heating element energizing circuit. The contact 18 is carried on a second flexible arm 25 which is electrically connected thereto. When the contacts 16 and 18 are brought into initial engagement, they complete a circuit for energizing the heating element 12 including the power source 14, line 26, heating element 12, line 28, bimetal heating means 24, contacts 16 and 18, flexible arm 25 and line 30.

Also included in the control device 10 is a lever and heated bimetal arrangement which enables the selective control of contacts 16 and 18 by a remotely controlled selector. A bimetal strip 34, heatable by a coil 36, is operable to pivot a lever 38 about its axis 40 and bend the arm 25 to cause the contacts to engage. The current in the heating coil 36 is supplied through a circuit including line 39, a heat output selector such as rheostat 41, line 42, transformer secondary winding 44 supplying low voltage from a standard line source, and line 46.

The system, therefore, operates in the following manner to provide a controlled heat emanating from the stove heating element 12. The stove operator manipulates the heat selector 41 to a desired setting from its off, or open, position as shown in FIG. 1. It is to be noted that in the off position no current flows through the heating coil 36. The bimetal strip 34 is unflexed so that contacts 16 and 18 are disengaged and maintain the circuit to the heating element 12 open. When the heat selector 41 is operated to a desired position a controlled amount of current passes through the circuit energizing the coil 36. The bimetal strip 34 deflects as it is heated to a certain position dependent upon the controlled heat generated by the coil 36. The deflection of the bimetal strip 34 causes the lever 38 to pivot about its axis 40 and flex the arm 25 carrying the contact 18. The contact 18 engages contact 16 and, depending upon the amount of the controlled current through heater coil 36, causes a certain amount of contact pressure between the contacts 16 and 18. The engagement of contacts 16 and 18 completes the circuit to the heater element 12 through the circuit including the heating element 12 and the heating means 24 on the supporting arm 20 bearing the contact 16. The heat generated by the heating means 24 tends to cause deflection of the bimetal strip 22 in the arm 20 so that contacts 16 and 18 will disengage when the contact pressure therebetween is overcome. When the contacts disengage, of course, the current through the stove heating element circuit discontinues and the heating of the bimetal strip 22 discontinues until such time as the contact 16 re-engages contact 18.

The control device 10, therefore, operates to regulate the on-off time of the heating element 12 and thereby controls the average heat output. As the controlled current through the heater coil 36 is increased, the contact pressure between contacts 16 and 18 imposed by the operation of the bimetal strip 34 and lever 38 is increased, thereby increasing the on time of the stove heating element 12 with respect to its off time. Conversely, as the current through the heater element 36 is decreased, the contact pressure is also decreased so as to reduce the on time of the heater element 12 with respect to its off time.

The system as shown has a regulating characteristic which compensates for changes in line voltage to maintain the average power delivered to the stove heating element constant. If the line voltage at source 14 decreases, the current, of course, through the series circuit including the heating element 12 also decreases. The decrease in current will cause less heating of the bimetal strip 22 in the contact supporting arm 20 and hence reduce its deflection. The reduced deflection of the supporting arm 20 causes the contact pressure between contacts 16 and 18 to increase which causes the on time with respect to the off time of the current in the circuit to increase.

The construction of a preferred embodiment of the control device 10 will now be described with special reference to FIGS. 2 through 4. The preferred embodiment of the control device 10 comprises a housing 46 within which are located the contacts 16 and 18, their flexible supporting arms 20 and 25 respectively, the lever 38 and the bimetal strip actuator 34. A jack 48, connectable to lead 28 in the heating element circuit, is secured to the housing 46 to support the bimetal strip 22 and a flexible resistive strip 50 (FIG. 4) which carries the contact 16 at its other end. The flexible strip 50 is formed of Nichrome or the like to provide heat due to current flow therethrough for affecting the operation of bimetal strip 22. The flexible strip 50 is electrically connected to the jack by means of rivet 51 so that the current in the heater element circuit will flow through the jack 48 and the strip 50 to the contact 16. There is provided an insulating strip 52 between the bimetal strip 22 and the flexible strip 50 to prevent shorting of current flow through the bimetal strip. The insulation also provides a time lag in the response of the bimetal strip to the heat generated in the Nichrome arm thus preventing chatter of the contacts. A plastic type insulator strip is preferred and it has been found that Teflon is ideal because it also reduces friction between the metal strips making up the flexible arm 20. Means such as as insulating sleeve 53 or winding surrounds the arm 20 to bind the strips in operable relationship.

A second jack 54 is held by the housing 46 which is connectable to the line 30 of the heating element circuit and also serves to support the flexible arm 25 carrying contact 18 at its opposite end. The arm 25 is riveted to the jack 54 and provides an electrical connection between the contact 18 and the jack 54. The jack 54 supports the arm 25 in a non-operated position in which the contacts 16 and 18 are disengaged.

The lever 38 is pivotally mounted about its axis 40 to have a portion of its surface 56 in engagement with the flexible arm 25. Bimetal strip 34, which is supported for cantilever action by a third jack 58, engages the lever 38 at its rotatable end 57 so that when current passes through the heating element 36 wound therearound its deflection will rotate the lever 38 about its axis 40 to control the engagement of contacts 16 and 18.

The heating means 36 for the bimetal strip 34 comprises a winding of resistive wire having one lead connected to the jack 58 and its other lead connected to a fourth jack 60. The jacks 58 and 60 are connectable to the wire leads 39 and 46 in the remote controllable circuit so that the heating of the bimetal strip 34 is controlled by the manipulation of the heat selector means 41.

While there has been disclosed herein a preferred embodiment of the invention, it is understood that many modifications may be made which would still be within the teachings of the invention. It is, therefore, intended that the invention be limited only by the scope of the appended claims.

What is claimed is:

1. Apparatus for controlling average electric power delivered to a load from a first power source comprising: a pair of contacts, a first flexible arm of resistive material supporting one of said contacts, a second flexible arm supporting the other contact, said arms acting to series connect said contacts, said load, said resistive material and said first power source, a low power, controllable current source separate from said first source, a first bi-metal strip, means connected to said low power source for heating said first bi-metal strip, lever means operable by said first bi-metal strip to flex said second arm for initiating engagement of said contacts and controlling the contact pressure therebetween, and a second bi-metal strip attached to and electrically isolated from and in heat absorbing relation with said resistive flexible arm to intermittently disengage said contacts responsive to the power delivered to said resistive material.

2. Apparatus for controlling the average electric power delivered from a first current source to a load comprising: a base, a first bi-metal strip mounted on said base and carrying a first contact, a first electrical heater operatively positioned in heat transfer relationship to said first bi-metal strip, a second bi-metal strip mounted on said base and spaced from said first bi-metal strip, a flexible arm operatively positioned on said base between said bi-metal strips, said flexible arm carrying a second contact normally spaced from said first contact, said contacts acting to series connect said load, said first electrical heater and said first current source, a lever carried by said base between said second bi-metal strip and said flexible arm to close said normally open contacts in response to flexing of said second bi-metal strip, and remote control means carried by said base for varying the on-off rate of said load circuit comprising a second electrical heater operatively positioned in heat transfer relationship to said second bi-metal strip and adapted to be connected to a low power, controllable current source, whereupon, energization of said second electrical heater acts to close said normally open contacts and maintain said flexible arm at a mechanical reference position determined by the value of said low power, current source.

3. Apparatus for controlling average electrical power delivered to a load from a first current source comprising: a pair of contacts, a pair of flexible arms each supporting one of said contacts in an initial non-engaging position, one of said arms comprising a first bi-metal strip, a first electrical heater operatively positioned in heat transfer relationship to said first bi-metal strip, said contacts acting to series connect said first electrical heater, said load and said first current source, a low power, controllable current source separate from said first source, a second bi-metal strip, means connected to said low power source for heating said second bi-metal strip, and lever means operable by said second bi-metal strip to flex one of said arms for initiating engagement of said contacts and controlling the contact pressure therebetween.

References Cited by the Examiner
UNITED STATES PATENTS

| | | | |
|---|---|---|---|
| 2,302,603 | 11/1942 | Davis et al. | 200—122 |
| 2,749,406 | 6/1956 | Clapp | 200—113 |
| 2,969,917 | 1/1961 | Nason | 200—122 |
| 2,993,976 | 7/1961 | Moore | 200—122 |

BERNARD A. GILHEANY, *Primary Examiner.*